March 5, 1935.  P. DRAKE  1,993,150
THROW LINE FISHING REEL
Filed March 27, 1933
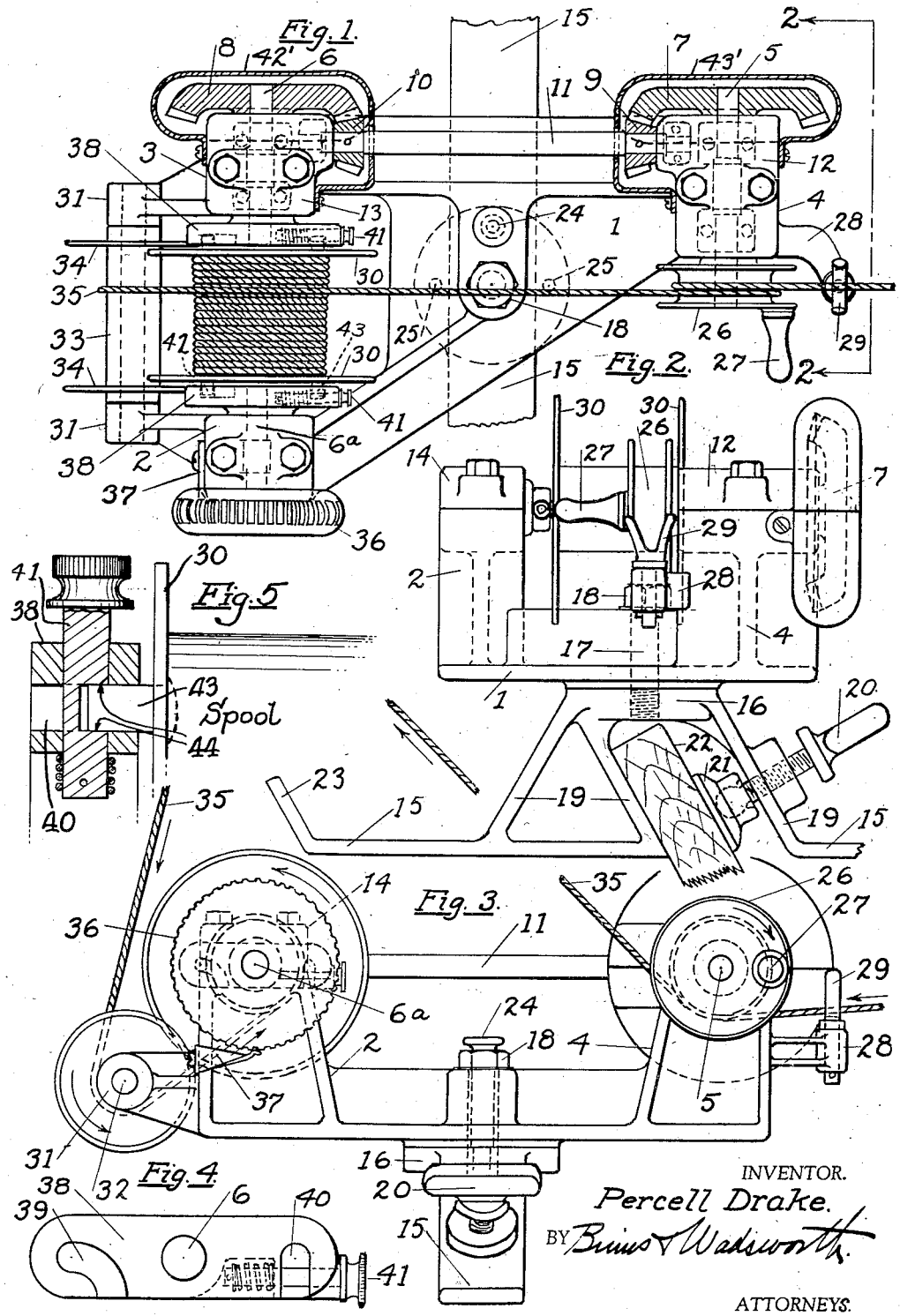
INVENTOR.
Percell Drake.
BY Bruno & Wadsworth
ATTORNEYS.

Patented Mar. 5, 1935

1,993,150

UNITED STATES PATENT OFFICE 1,993,150

THROW LINE FISHING REEL

Percell Drake, Detroit, Mich.

Application March 27, 1933, Serial No. 662,978

5 Claims. (Cl. 242—84.1)

This invention relates to fish line reeling apparatus of a type adapted to utilize the manual pull on an incoming line as a means for simultaneously actuating rewinding mechanism, the principal object of the invention being to provide adequate means for eliminating trouble arising from tangling of throw lines, which with this apparatus may be recast, after rewinding, without encountering excessive retardation due to frictional resistance of moving parts of the rewinding mechanism, but the degree of freedom with which the line runs out may easily be controlled by braking means suitably applied to the rotating shaft thereof.

Besides ease of operation, another of the objects of the invention is to provide a reel as well adapted for use on boats, to which it may detachably be clamped, as for use on shore when held rigidly to the ground by foot pressure only, and the line may also be brought in and rewound by means of a crank handle attached to the pulley around which the line is wound several times after being cast, this pulley normally being turned by pulling the line inboard, an operation which sets the rewinding mechanism in motion.

Other objects will appear as the description proceeds, but it is to be understood that the disclosed embodiment of the invention may be changed considerably without departing from the spirit and scope of the appended claims in defining the invention.

Of the accompanying drawing illustrating the construction and operation of my apparatus.

Figure 1 is a plan showing the disposition of parts as viewed from above.

Fig. 2 is a forward-end elevation looking in the direction of the arrows 2—2 in Fig. 1, bringing out the relation of parts to the swingable clamp-carrying support by which the apparatus may be held to the ground by foot pressure or be attached to the sides or stern of an open boat, the thumb wheel 36 being omitted.

Fig. 3 is a view showing the parts in elevation and indicating how the rewinding mechanism is actuated by pulling the line inboard by hand, the direction of pull and of movement of line being indicated by arrows.

Fig. 4 is a front elevation of one of a pair of spool-holding elements of the rewinding mechanism, one serving as a spool driver while the other serves as an aligning support that steadies the spool and takes a part of the rewinding stress.

Fig. 5 is a fragmentary horizontal section through the locking-pin end of one of the spool holders 38 showing the cut-out or slotted portion 44 of the locking pin 41 in its relation to slot 40 when pin is pulled out to permit spool flange pin to pass into slot, retraction of pin 41 locking flange pin 43 therein.

In all views similar parts are designated by like reference numerals, 1 indicating a base member having upstanding supports, 2, 3, and 4 for transversely-disposed shafts 5 and 6 on which are mounted bevel gears 7 and 8 meshing with smaller bevel gears 9 and 10 at the ends of a horizontally-disposed shaft 11 journaled in ball bearings carried by supports 3 and 4 and held in place by bearing caps 12 and 13 which also embrace the ball bearings wherein the outer ends of shafts 5 and 6 are journaled. The bearing cap for shaft support 2 is identified by the numeral 14.

For convenience in attaching the apparatus to a boat or holding it to the ground by foot pressure, there is provided a member 15 upon which the apparatus is mounted, the heavy upper portion 16 of the supporting member carrying a stud 17 about which the base member 1, through which the stud passes freely, may be turned, the retaining nut 18 holding the parts together. The support member 15 is provided with angularly-set leg elements 19 that serve as part of the clamping means which comprises a T-headed screw 20 passing through a boss on one of the legs 19, a ball and socket type of end 21 being provided to facilitate seating against the surface 22 of the piece to which the apparatus is held tightly by the clamping screw. When held to the ground an upstanding ear 23 prevents the foot from slipping off.

The supporting bracket 15 may be swung lengthwise out of the way and under the base member 1 upon withdrawing from the base opening formed to receive it the spring-retracted pin 24 that normally holds the bracket 15 in a desired position depending upon which one of the base openings 25 the pin 24 occupies.

Attached to the forward-end cross shaft 5 is a pulley 26 provided with means 27 for turning it by hand rather than by the pull on the line, which is wrapped around it for that purpose, the handle 27 providing a means of drawing in the line that is more convenient to use when wading while fishing.

Projecting from the forward-end cross shaft support is a bracket-member 28 for supporting a line-guiding member 29 which is free to oscillate therein sufficiently to guide the line without subjecting it or the apparatus to excessive sharp-turn stress, the width between pulley-flanges being made great enough to insure proper feeding of line to rewinding spool as the line moves transversely back and forth between the flanges 30 thereof.

Projecting from the rearward sides of the shaft-supporting members 2 and 3 are integral brackets 31 supporting a shaft 32 on which is mounted a plain roller 33 having flanges 34 between which the line 35 moves transversely back and forth as it builds up and similarly moves on the rewinding spool, whose flanges 30 are overlapped by the roll-flanges 34, as shown by Fig. 1.

For retarding or stopping the outrunning line a brake 36 of hand-wheel or other type may be attached to the end of the non-driving rewinding-spool shaft 6a, and notches cut in the face thereof to receive one end of a noise-producing vibrator element 37 may be made to serve for signaling a "strike" when trolling.

The spool which is detachable and upon which the line is rewound as it comes inboard has end flanges 30, through each of which project two short pins 42 and 43 at points equidistant from the axis of the spool. Two oppositely-positioned holders 38 attached to shafts 6 and 6a are provided with recesses 39 and 40 into which these pins are slipped when the spool is placed in position between the holders. The pins 42 in recesses 39 are prevented from coming out by curving the recesses in the manner indicated by Fig. 4, while the other pins 43 are retained by the spring-retracted locking pins 41, each of which has a cut-out portion 44 permitting the spool-flange pin to pass to its seating point in slot 40 of each holder 38. When the holders 38 occupy the position indicated in Fig. 1, one pair of spool pins may be slipped into the arcuately-formed slots 39, the other pair of flange pins then passing to bottom of slots 40 when spring-retracted locking pins 41 are withdrawn sufficiently and holding them when springs retract locking pins.

The bevel-gears transmitting the manually-developed power applied to the forward-end shaft 5 for driving the rearwardly-disposed shaft 6 and line rewinding spool are covered by circular casings 42' and 43' having projecting ears by which they are attached to the bearing supports 3 and 4, the casings being split horizontally in the centerline plane of the drive shaft 11 to permit of their application, the casings serving to protect the gears and prevent damage to incoming line, which would be liable to be caught between exposed gears.

Having described my invention in a manner to make it understood by persons familiar with the art to which it relates,

I claim:

1. A throw-line fishing reel comprising a supporting member adapted to be held to the ground by foot pressure and carrying means for detachably fastening it to some part of a boat, a base member turnably mounted upon said supporting member and carrying line-rewinding mechanism embracing a plurality of rotatable shafts, an intermeshing train of gears mounted on and connecting said shafts, line-protecting housings enclosing said gears, a pulley mounted on the end of one of said shafts and frictionally engaged by thrown line wound around it turning said shafts when line is pulled inwardly, a spool detachably connected to and driven by another of said shafts taking and rewinding the incoming line, braking means controlling freedom of outgoing movement of line, and tell-tale means indicating "strike" or catching of line on some underwater obstruction.

2. A throw-line fishing reel comprising a combined attaching and supporting member carrying means for clamping the reel to some part of a boat and for holding it to the ground by foot pressure, a base member swingably mounted thereon and carrying un-rewinding mechanism operable by pulling force applied to incoming line, said mechanism comprising a plurality of shafts carrying intermeshing gears and set in rotary motion by movement of line, a pulley mounted on the end of one of said shafts and frictionally engaged by the line wound around it turning said shafts when line is pulled inwardly, a line rewinding spool detachably connected to and driven by another of said shafts, and line-protecting casings covering said intermeshing gears.

3. Fish-line rewinding apparatus actuated by moving line and comprising a supporting member adapted to be held to the ground by foot pressure and carrying clamping means for attaching it to some part of a boat, a positionally adjustable base member mounted upon said supporting member, a plurality of shafts rotatably mounted in bearings of said base member, intermeshing gears mounted on and connecting said shafts, housings enclosing said gears and preventing damage to line, a pulley mounted on the end of one of aid shafts and serving as means whereby the indrawing pull on the line wound around and gripping said pulley is utilized in actuating said shafts, and a line-holding spool detachably connected to and driven by another of said shafts to rewind incoming line.

4. A throw-line fishing reel comprising a supporting member adapted to be held to the ground by foot pressure and having means for detachably fastening it to a boat, a base member swingably mounted thereon and carrying line-rewinding mechanism actuated for rewinding line by indrawing pull manually applied thereto, said mechanism embracing a plurality of rotatable shafts journaled in suitable base-member bearings, intermeshing gears mounted on and connecting said shafts, line-protecting housings enclosing said gears, a pulley mounted on the end of one of said shafts serving as means whereby movement of the line wound around and frictionally engaging said pulley turns said shafts, auxiliary crank-handle shaft-turning means attached to said pulley, a replaceable line-carrying spool detachably held to and driven by another of said shafts, means detachably holding spool to the shaft that drives it, and means guiding line to said pulley and said spool.

5. Fishline reeling apparatus comprising a supporting member adapted to be held to the ground by foot pressure and carrying clamping means for detachably holding it to side or stern of a boat, a base member turnably mounted upon said supporting member and carrying line-rewinding mechanism subject to hand-crank operation and to actuation by indrawing pull on line, said mechanism embracing a plurality of drive shafts, connecting intermeshing gears fixedly mounted thereon, an actuating pulley on the end of one of said shafts frictionally engaged by line wound around it turning said shafts and gears when line is pulled inwardly, housings enclosing gears on said shafts and preventing injury to moving line, a line-rewinding spool detachably connected to and driven by another of said shafts, means adetachably connecting said line-rewinding spool to the shaft that drives it, braking means controlling retardation of out-going movement of line, and means guiding line to said actuating pulley and to said rewinding spool.

PERCELL DRAKE.